(12) United States Patent
Kampmann

(10) Patent No.: US 9,106,722 B2
(45) Date of Patent: *Aug. 11, 2015

(54) DYNAMIC TRANSCODER PLACEMENT

(71) Applicant: TELEFONAKTIEBOLAGET L M ERICSSON (PUBL), Stockholm (SE)

(72) Inventor: Dirk Kampmann, Vaals (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 167 days.

This patent is subject to a terminal disclaimer.

(21) Appl. No.: 13/973,287

(22) Filed: Aug. 22, 2013

(65) Prior Publication Data

US 2013/0336219 A1 Dec. 19, 2013

Related U.S. Application Data

(63) Continuation of application No. 12/676,736, filed as application No. PCT/EP2008/061721 on Sep. 4, 2008, now Pat. No. 8,543,119.

(60) Provisional application No. 60/970,103, filed on Sep. 5, 2007.

(51) Int. Cl.

| H04W 84/18 | (2009.01) |
| H04L 29/06 | (2006.01) |
| H04W 88/18 | (2009.01) |
| H04M 7/00 | (2006.01) |
| H04W 88/12 | (2009.01) |

(52) U.S. Cl.
CPC ........... H04L 65/601 (2013.01); H04W 88/181 (2013.01); *H04M 7/0072* (2013.01); *H04W 88/12* (2013.01)

(58) Field of Classification Search
None
See application file for complete search history.

*Primary Examiner* — Hassan Phillips
*Assistant Examiner* — Gautam Sharma

(57) ABSTRACT

The invention provides for a dynamic transcoder placement in case that transcoding functionality for codecs is offered in a TRAU associated to a Base Station Controller and/or a MGW selected for a call.

14 Claims, 4 Drawing Sheets

DYNAMIC TRANSCODER PLACEMENT

CROSS-REFERENCE TO RELATED APPLICATIONS

This application is a continuation of U.S. application Ser. No. 12/676,736, filed Mar. 24, 2010, now pending, which was the National Stage of International Application No. PCT/EP2008/061721, filed Sep. 4, 2008, which claims the benefit of U.S. Provisional Application No. 60/970,103, filed Sep. 5, 2007, the disclosure of which is incorporated herein by reference.

TECHNICAL FIELD

The invention relates to the field of telecommunication and more specific to the placement of transcoding resources.

BACKGROUND

Recently discussions are triggered in 3GPP standardization body to use IP transport bearer for the A-interface (A over IP, AoIP), the interface between the Radio Network (RAN) and the Core Network (CN). In the discussion it is indicated that IP transport on the A-interface user plane connection offers the opportunity to move transcoder functionality from the respective GERAN (GSM EDGE Radio Access Network) node where it is placed within an associated Transcoder and Rate Adapter Unit (TRAU), to a node within the core network, i.e. a Media Gateway (MGW) node.

If transcoder functionality is placed in GERAN according to current 3GPP standard, then PCM is used as codec type on A-interface user plane connection. If transcoder functionality is placed in the core network (option with A over IP) then the same codec type may be used on the air interface (GERAN) and on the A-interface user plane connection.

In a recent, yet unpublished, patent application PCT/EP2007/060586 a procedure is proposed how a BSC (Base Station Controller) may inform a MSC (Mobile Switching Center) about restriction of transcoder resources. In case a BSC does not provide specific transcoder resources for some codec types or specific transcoder resources shall not be used then the codec types are marked (or removed) from the early messages exchanged between BSC and MSC at call setup.

Typically, within the process of channel assignment a MSC sends a list of codec types (e.g. SCVL) applicable for the call to a BSC. The list may be ordered by preference, i.e. in increasing or decreasing preference. The final decision, which codec is used for the channel assignment is done within the BSC. The BSC might select any codec from the list based on internal decision algorithms.

It may be that not all transcoder functionality is moved from the GERAN towards the core network.

In a first Example, it may happen that transcoding is offered in core network for some specific codec type and in GERAN for the same codec type.

In another Example, it may happen that an operator wants to (re-)use its current investment in GERAN (e.g. transcoder for codec type X in a Transcoder and Rate Adapter Unit (TRAU)) and uses the introduction of A over IP (AoIP) to invest in new devices within the core network (transcoder for the codec type Y in MGW).

It is a drawback of the prior art, that the BSC does not have any knowledge of Media Gateway capabilities in general and their availability in particular. Thereby, a BSC is not able to place a transcoding resource within the Core Network without hazarding the consequence that said transcoding resource might be in fact unavailable in the Core Network.

It would therefore be advantageous to have a so far unknown solution allowing for an intelligent decision on and the respective placement of the transcoding functionality within the RAN or within the Core Network, preferably on a call-by-call basis.

SUMMARY

It is the object to obviate at least some of the above cited disadvantages and provide improved methods and devices as outlined in the following.

In a first embodiment a Method for a Base Station Controller (BSC) of a mobile communication network for deciding on the placement of a transcoding functionality for a call is proposed.

The call involves a User Equipment (UE), said Base Station Controller and a Media Gateway (MGW) controlled by a respective Mobile Switching Center Server (MSC-S). The mobile communication network allows for communication according to an IP Protocol.

In a first step the BSC receives from said Mobile Switching Center Server an indication of a codec type applicable to said call. Said codec type might be accompanied by an indication (TRI) whether the transcoding of said codec type could be placed in the selected Media Gateway or in a Transcoder and Rate Adapter Unit (TRAU) assigned to said Base Station Controller for said call. Alternatively the indication might be received in separate message.

Thereafter the BSC selects to place the transcoding functionality either within the assigned Transcoder and Rate Adapter Unit or within the selected Media Gateway and sends towards the Mobile Switching Center Server information on the selected codec and the placement of the transcoding functionality.

Correspondingly, the invention is also embodied in a Method for a Mobile Switching Center Server (MSC-S) of a mobile communication network for deciding on the placement of a transcoding functionality for a call.

The call involves a User Equipment (UE), a Base Station Controller and a Media Gateway (MGW) controlled by said Mobile Switching Center Server (MSC-S). The mobile communication network allows for communication according to an IP Protocol.

In a first step, the MSC-S sends towards said Base Station Controller an indication of a codec type applicable to said call. Said codec type might be accompanied by an indication (TRI) whether the transcoding of said codec type could be placed in the selected Media Gateway or in a Transcoder and Rate Adapter Unit (TRAU) assigned to said Base Station Controller for said call. Alternatively the indication might be sent in separate message.

Thereafter, the MSC-S receives from the Base Station Controller (BSC) information on the selected codec and the placement of the transcoding functionality based on a selection within the Base Station Controller on the availability of transcoding functionality within the assigned Transcoder and Rate Adapter Unit to place the transcoding functionality either within the assigned Transcoder and Rate Adapter Unit or within the selected Media Gateway.

Further embodiments of the invention pertain to corresponding devices and further advantageous embodiments detailed in the dependent claims.

By providing these embodiments, it is now possible to base the decision on a codec and the placement of the corresponding transcoding functionality on a call-by-call basis allowing for a smart selection and thereby solving at least some of the disadvantages associated to the prior art.

DETAILED DESCRIPTION

According to an embodiment of the invention a procedure is proposed allowing deciding if a transcoder shall be placed in RAN or in core network. The decision is made within a BSC, since the BSC should be the node that finally selects a codec type for the RAN access.

In order to support the decision process the MSC provides information about the availability of transcoder resources in core network.

By providing such information, the BSC is enabled to decide whether for a call a transcoder functionality is needed within a TRAU associated to the BSC or whether the transcoder functionality of a selected MediaGateway may be used.

In further embodiments, the MSC may indicate as well its preference, where a transcoder resource for a specific codec type should be placed either in RAN or within a selected MGW.

Introducing preference information provides the means to utilize in RAN existing transcoder resources for a specific codec type when transcoder resources for the same codec type are available in core network as well.

Furthermore, such a preference may allow for basing the decision within the BSC on a finer granularity.

Figure 1:
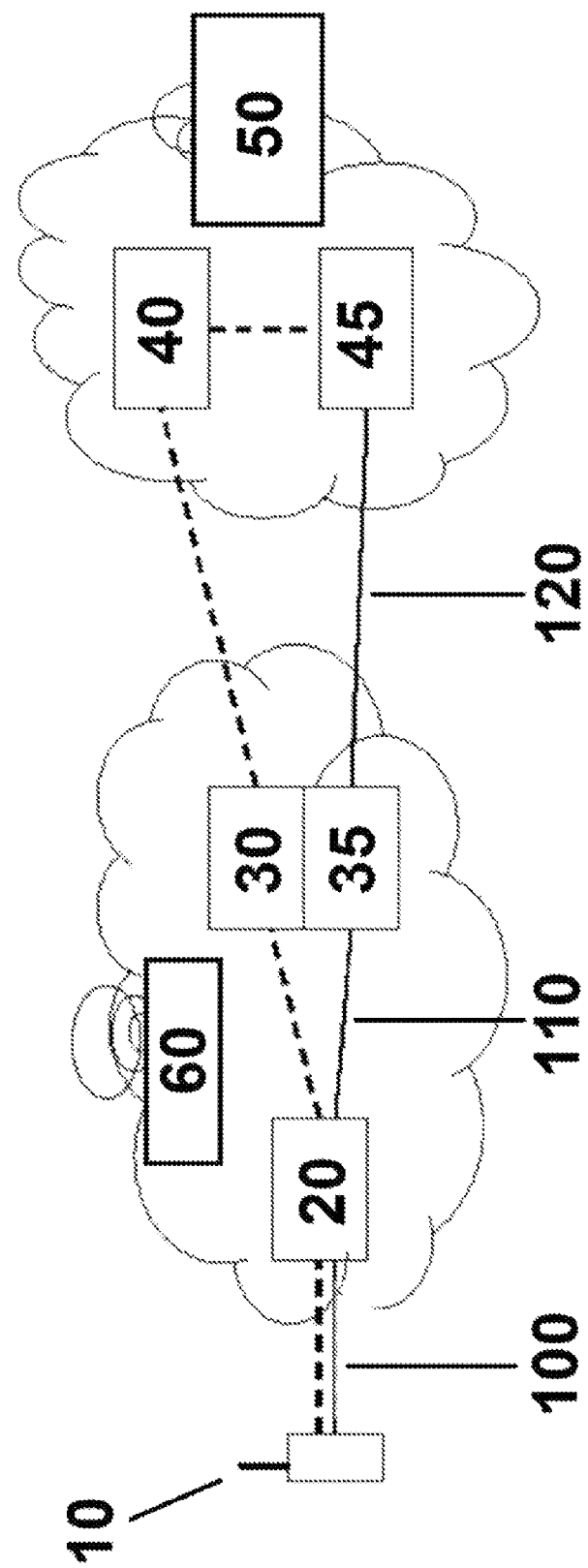
FIG. 1 shows an exemplary network scenario for employing the invention.

The invention will be now further detailed with respect to FIG. 1.

In FIG. 1, a User equipment (UE) 10 may communicate via the air interface 100 with a suitable Radio Access Network 60 and via said Radio Access Network (RAN) 60 with a Core Network (CN) 50.

Such a radio Access Network may be embodied in a GERAN, i.e. a GSM EDGE Radio Access Network.

Within said RAN 60 a Base Transceiver Station (BTS) 20 may communicate via respective interfaces(s) with a Base Station controller (BSC) 30 and—if necessary—with an associated Transcoder and Rate Adapter Unit (TRAU) 35. Said interface towards the BSC is part of the signaling plane indicated in the Figure by a dashed line. The Base station Controller 30 may communicate via a respective interface with a Mobile Switching Center Server (MSC-S) 40. Said interface is again part of the signaling plane indicated in the Figure by a dashed line.

Mobile Switching Center Server 40 and a Media Gateway 45 form part of the Core Network 50. The Media Gateway (MGW) 45 is part of the user plane indicated in the Figure by the solid line.

Within networks it is possible to deploy transcoding functionality not only within the TRAUs but it is also possible to deploy such functionality within a Media Gateway.

In a first scenario this would mean that the UE and the BTS may communicate on the respective user plane portion 100 using a codec X, which codec is also used on the user plane portion 110 towards the TRAU. However, than within the TRAU the transported user plane information is transcoded into another code, e.g. in PCM (Pulse Code Modulation), and transported towards a respective Media Gateway on the respective user plane portion 120 in said "transcoded" form. This is the classical situation according to current 3GPP standard, In a second scenario, the UE and the BTS may communicate on the respective user plane portion 100 using a codec X. However, due to the fact that transcoding could be performed within the Media Gateway, the user plane information may be now transported towards the MGW where it is than transcoded.

Both scenarios may also occur at the same time, e.g. transcoding functionality for the same codec X is available in both a TRAU 35 and a MGW 45, and the TRAU 35 may offer transcoding functionality for a codec Y while the MGW 45 offers transcoding functionality for another codec Z.

In order to allow a smart selection where to place the transcoding functionality, the Base Station Controller 30 needs information on the respective transcoding functionality.

In some cases a call shall utilize the transcoder resources within RAN 60 while other calls shall utilize transcoder resources in core network 50.

In some cases it may even be desirable to decide the placement of transcoder resources on a call by call basis. Such a decision could be based on but is not limited to the following criteria:

a codec type
b transcoder resource availability
c transcoder resource utilization Typically, a BSC 30 makes a decision, which codec type is used, e.g. in a respective channel assignment procedure. In order to select an appropriate codec from a given list (e.g. a SCVL) the BSC 30 should know which one of the sub-network—either RAN 60 or core network 50—is capable of/responsible for providing transcoder resources. In order to enable an appropriate decision, the BSC 30 needs information from a respective MSC-S 40 for which codec types the core network within the selected Media Gateway 45 may provide transcoder resources. This information is provided preferably on a call by call base, Therefore, it is proposed that the MSC-S 40 controlling the Media Gateway 45 selected for a call may send towards the BSC 30 an indicator (Transcoding Request Information, TRI). This indicator may be added to the message used to send the list of codec types. Such a list of codec types is for example a Speech Coder Version List (SCVL) and an exemplary message to which the indicator may be added is a BSSMAP Assignment Request.

An MSC-S 40 may provide the information for a single codec, all codec types defined in 3GPP or only for those specified in SCVL.

The indicator (TRI) provides information about codec types, for which the selected Media Gateway 45 within the core network 50 may provide resources. In addition, the MSC-S 40 may indicate if it prefers transcoding in the RAN (e.g. within associated TRAU 35) or not. This option gives the BSC 30 the freedom to utilize transcoder resources in RAN (e.g. within associated TRAU 35) up to 100% before transcoder resources in core network are needed or vice versa.

Table 1 describes an exemplary use of possible values for this new indicator (TRI).

TABLE 1

Transcoder Request Information

| TRI Value | Binary representation | Selected MGW supports the codec type on the AoIP interface user plane connection. |
|---|---|---|
| Mandatory | 00 | No |
| Preferred | 01 | (Yes) |
| Optional | 10 | (Yes) |
| Not Allowed | 11 | Yes |

According to an embodiment, the TRI value sent by the MSC-S 40 may indicate that the selected MGW 45 for the call does not support the respective codec type on the AoIP interface user plane connection, in this case the TRI Value would correspond to "Mandatory". Then the BSC 30 should not select the corresponding codec if no transcoding functionality is available within a TRAU 35 associated to the BSC 30.

If however, the TRI value sent by the MSC-S 40 indicates that the selected MGW 45 for the call supports the respective codec type on the AoIP interface user plane connection, i.e. the TRI Value would correspond to "Not allowed", than the BSC 30 is allowed to select the codec even if no transcoding functionality is available within a TRAU 35 associated to BSC 30. In other words, if transcoding to PCM is not supported on the A Interface user plane connection for a specific codec type, than this specific codec could be selected also for the A Interface user plane connection.

To achieve such a basic indication it would be sufficient to have a single bit, indicating that the transcoding functionality is available (Yes) in the selected MGW or not (No). In the first case, the transcoding functionality for the respective codec of the RAN 60 is utilized within the associated TRAU 35, while in the second case "No", the transcoding functionality for the respective codec of the CN 50 is utilized if the respective codec is selected within the BSC 35.

In order to allow for a smart selection, further granularity is provided affording to transfer more information.

This is already indicated in above table 1, allowing for indicating 4 different states. The states expressed above as "Mandatory" and "Not allowed" correspond to "No" and "Yes". Two additional states are indicated.

A first state "Preferred" may be used to indicate that the selected MGW 45 for the call would prefer to locate the transcoding functionality within the RAN 60, i.e. a TRAU 35 associated to the BSC 30. A reason therefore might be that the Media Gateway selected for the call already bears a certain amount of load.

A second state "Optional" may be used to indicate that the selected MGW 45 for the call would not mind to locate the transcoding functionality within the Core Network 50, i.e. within the selected Media Gateway 45. A reason therefore might be that the Media Gateway selected for the call already bears only a limited amount of load.

Although these two states "Preferred" and "Optional" express a certain preference, the final decision on the placement of the transcoding functionality remains within the BSC 30.

The indicator might be added to any appropriate message, e.g. BSSMAP Assignment Request or sent separately.

When the BSC 30 indicates completion of channel assignment to MSC-S 40 it should provide the information which codec is used for channel assignment and if a transcoder was inserted in RAN 60.

Obviously, in the above embodiments a codec may also be accompanied by a plurality of indications relating to a preference.

Furthermore, if the BSC decides to place the transcoding functionality within the Core Network, e.g. within a MGW selected for the call, no assignment of a TRAU needs to be performed and the user plane connection can be made directly from the Base Transceiver Station towards the selected MGW.

Figure 2:
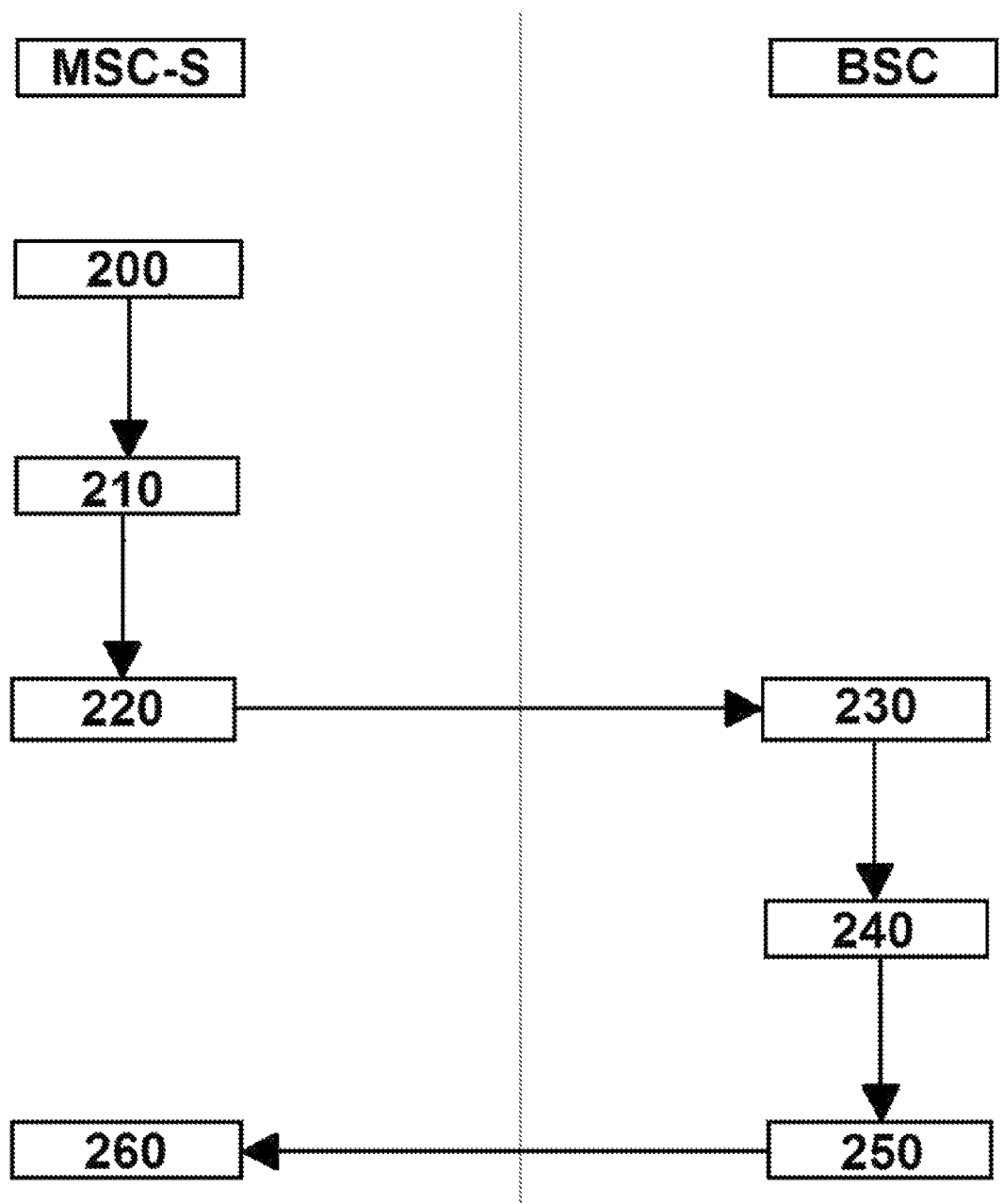
FIG. 2 shows an exemplary flow chart of embodiments of the invention.

Having now described the invention in a more general manner, the invention will now be further detailed with respect to FIG. 2.

FIG. 2 shows an exemplary flow chart detailing several aspects of the invention.

In the following it is assumed that a Mobile Switching Center Server (MSC-S) 40 detects a need to set up a user plane connection of a call involving a user equipment 10, a Base Station Controller 30 and a Media Gateway 45 controlled by said respective Mobile Switching Center Server 40 in a step 200. In a next step 210 the MSC-S 40 determines available codecs of the MGW 45 assigned for the call.

Than the MSC-S 40 sends in a step 220 towards said Base Station Controller 30 an indication of a codec type applicable to said call. This codec type may be accompanied by an indication (TRI) whether the transcoding of said codec type could be placed in the selected Media Gateway 45 or in a Transcoder and Rate Adapter Unit (TRAU) 35 assigned to said Base Station Controller 30 for said call. Obviously, the indication could also be sent separately.

In further embodiments, the MSC-S 40 might send in a step 220 towards said Base Station Controller 30 a plurality of indications of codec types, e.g. list of codec types, applicable to said call. Obviously, the codec list or individual codecs may accompanied by one or more indications (TRI) whether the transcoding of said codec type(s) could be placed in the selected Media Gateway 45 or in a Transcoder and Rate Adapter Unit (TRAU) 35 assigned to said Base Station Controller 30 for said call. Obviously, the indication(s) could also be sent separately.

In still further embodiments, a preference where to place the transcoding of said codec type either in the selected Media Gateway 45 or in a Transcoding Unit 35 assigned to said Base Station Controller 30 for said call is sent towards the Base Station Controller 30.

Obviously, in the above embodiments a codec may also be accompanied by a plurality of indications relating to a preference.

In a corresponding step 230 the BSC 30 receives from said Mobile Switching Center Server 40 said indication of a codec type or said list of codec types applicable to said call, and one or more an indication(s) (TRI) whether the transcoding of said codec type(s) could be placed in the selected Media Gateway 45 or in a Transcoder and Rate Adapter Unit (35) assigned to said Base Station Controller 30 for said call. Obviously, the indication(s) could also be received separately.

In a still further embodiment as outlined above, a preference where to place the transcoding of said codec type either in the selected Media Gateway 45 or in a Transcoding Unit 35 assigned to said Base Station Controller 30 for said call is received in the Base Station Controller 30.

In a further step performed by the BSC 30, the BSC selects to place the transcoding functionality either within the assigned Transcoder and Rate Adapter Unit or within the selected Media Gateway 45, and in a following step 240 the BSC 30 sends towards the Mobile Switching Center Server 40 information on the selected codec and the placement of the transcoding functionality.

In a corresponding step 260 the Mobile Switching Center Server 40 receives from the Base Station Controller (BSC) 30 said information on the selected codec and the placement of the transcoding functionality based on a selection within the Base Station Controller on the availability of transcoding functionality within the assigned Transcoder and Rate Adapter Unit to place the transcoding functionality either within the assigned Transcoder and Rate Adapter Unit or within the selected Media Gateway.

In order to allow for implementation of the above outlined methods, the respective devices have to be arranged accordingly as will be detailed in the following with respect to FIGS. 3 and 4.

Figure 3:
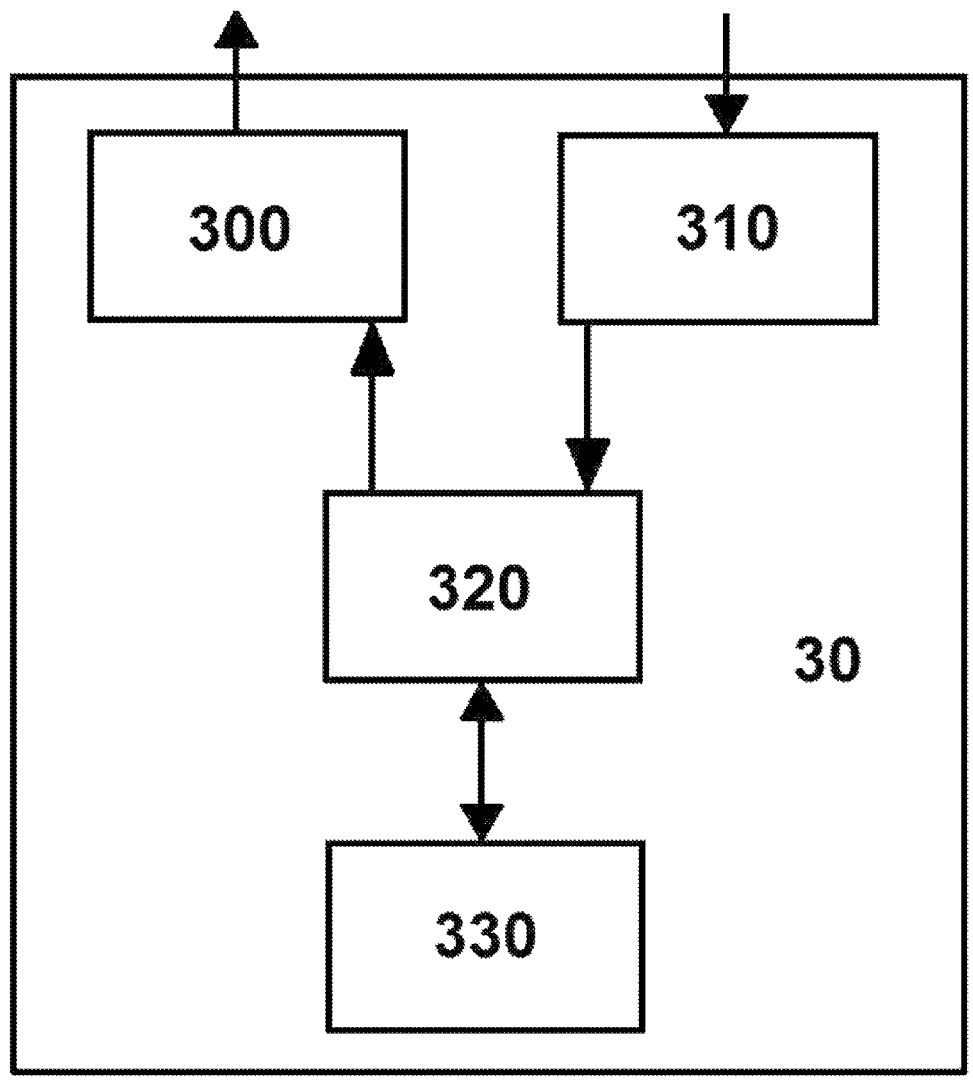
FIG. 3 shows an exemplary structure of a Base Station Controller embodying the invention.

In FIG. 3, an exemplary structure of a Base Station Controller 30 embodying the invention is shown.

The Base Station Controller 30 comprises a receiver 310 for receiving from a Mobile Switching Center Server an indication of a codec type applicable to a call. Said receiver 310 is further arranged to receive an indication (TRI) whether the transcoding of said codec type could be placed in the selected Media Gateway or in a Transcoder and Rate Adapter Unit of (TRAU) assigned to said Base Station Controller 30 for said call.

Furthermore, the Base Station Controller 30 comprises a processing unit 320 for selecting to place the transcoding functionality either within the assigned Transcoder and Rate Adapter Unit 35 or within the selected Media Gateway 45.

In addition, the Base Station Controller 30 comprises a transmitter 300 for sending towards said Mobile Switching Center Server 40 information on the selected codec and the placement of the transcoding functionality.

In further embodiments the receiver 310 of the Base station controller 30 is further adapted to receive an indication on a preference where to place the transcoding of said codec type either in the selected Media Gateway 45 or in said Transcoding Unit (TRAU) 35 assigned to said Base Station Controller 30 for said call.

In still further embodiments the receiver 310 of the Base station controller 30 is further adapted to receive a plurality of indications of a codec type applicable to said call and a corresponding plurality of indications of indication (TRI) whether the transcoding of said codec types could be placed in the selected Media Gateway 45 or in a Transcoder and Rate Adapter Unit (TRAU) 35 assigned to said Base Station Controller 30 for said call.

Obviously, in the above embodiments a codec may also be accompanied by a plurality of indications relating to a preference.

Still further, the processor 30 of said Base station controller 30 may be further adapted to base the selection to place the transcoding functionality on the availability of transcoding functionality within the assigned Transcoder and Rate Adapter Unit.

In order to support the selection, an optional memory unit 330 for storing parameters might be provisioned.

Obviously, the receiver 310 and the transmitter 300 might also be provided in a condensed I/O-Unit.

A further integration might also allow providing the complete functionality of the invention within a single unit 30.

Figure 4:
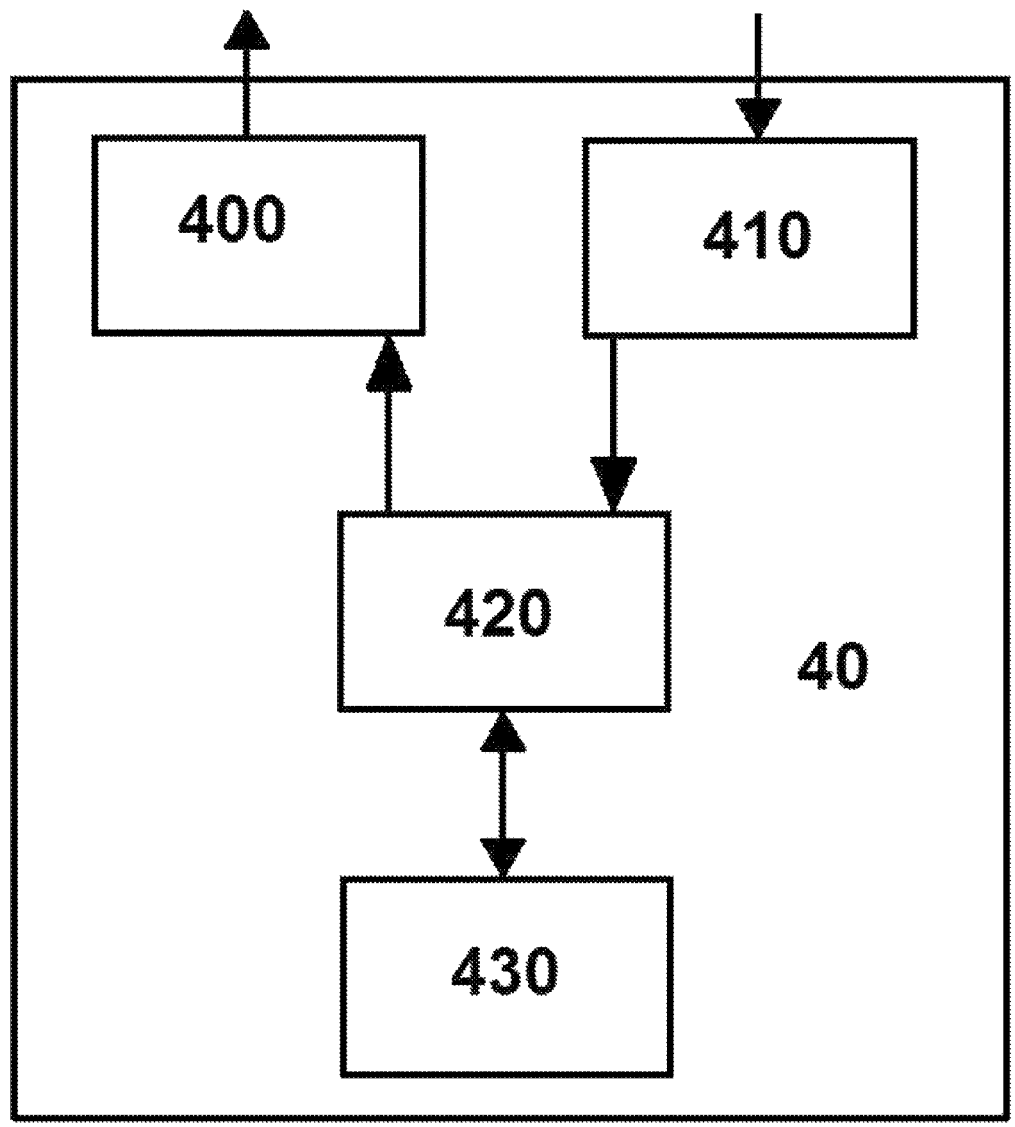
FIG. 4 shows an exemplary structure of a Mobile Switching Center Server embodying the invention.

In FIG. 4 an exemplary structure of a Mobile Switching Center Server embodying the invention is shown.

The Mobile Switching Center Server (MSC-S) 40 comprises a transmitter 400 for sending towards a Base Station Controller 30 an indication of a codec type applicable to said call. Said transmitter 400 is further arranged for sending towards said Base Station Controller 30 an indication (TRI) whether the transcoding of said codec type could be placed in the selected Media Gateway 45 or in a Transcoder and Rate Adapter Unit (TRAU) 35 assigned to said Base Station Controller 30 for said call.

Furthermore, the Mobile Switching Center Server (MSC-S) 40 comprises a receiver 410 for receiving from the Base Station Controller 30 information on the selected codec and the placement of the transcoding functionality based on a selection within the Base Station Controller 30. The Base Station Controller 30 selection in based on the availability of transcoding functionality within the assigned Transcoder and Rate Adapter Unit 35 and allows for placing the transcoding functionality either within an to be assigned Transcoder and Rate Adapter 35 Unit or within the selected Media Gateway 45.

In addition, the Mobile Switching Center Server (MSC-S) 40 may comprise a processor 420 arranged for detecting a need to set up a user plane connection of a call. Said processor 420 is further arranged to determine available codecs of the MGW 45 assigned for the call.

In further embodiments the transmitter 400 of said Mobile Switching Center Server (MSC-S) 40 may be further arranged to send an indication on a preference where to place the transcoding of said codec type either in the selected Media Gateway 45 or in a Transcoding Unit (TRAU) 35 assigned to said Base Station Controller 30 for said call towards the Base Station Controller 30.

In still further embodiments the transmitter 400 of said Mobile Switching Center Server (MSC-S) 40 may be further arranged to send a plurality of indications of a codec type applicable to said call and a corresponding plurality of indications of indication (TRI) whether the transcoding of said codec types could be placed in the selected Media Gateway 45 or in a Transcoder and Rate Adapter Unit of (TRAU) 35 assigned to said Base Station Controller 30 for said call.

Obviously, in the above embodiments a codec may also be accompanied by a plurality of indications relating to a preference.

In order to support the selection, an optional memory unit 430 for storing parameters might be provisioned.

Obviously, the receiver 410 and the transmitter 400 might also be provided in a condensed I/O-Unit.

A further integration might also allow providing the complete functionality of the invention within a single unit 40.

By providing the above mentioned devices and methods it is possible to manage transcoder resources in RAN and in core network for different codec types. By means of the invention, the BSC now may select to place a codec either in Core Network or in the RAN based on knowledge provided by the MSC-S.

Consider the situations described above, if transcoding functionality for a codec X is available in the selected Media Gateway, the BSC now may select this codec even though no resources for said codec are available within a TRAU. It could thereby by-pass the TRAU using a selected codec from the UE via the BTS directly towards the Media Gateway.

If transcoding functionality is not available for a codec X in the selected Media Gateway than the BSC now is disallowed to select this coded if no resources for said codec are available within a TRAU.

By introducing a preference scheme, the BSC is further enabled to base its decision on a finer granularity and may thereby also provide for a load balancing both in the network as well as in the respective used resources.

Hence, it is by means of the invention now possible to manage transcoder resources in RAN and in core network for the same and different codec types By means of the invention, it is possible to decide on a call-by-call basis if a transcoder is seized in RAN or core network.

It is understood that although the invention has been described to pertain to a split architecture having a functional split into a MSC-S and corresponding Media Gateways, the invention could also be embodied in a monolithically MSC.

Although the invention has been described with respect to different physical entities, it is apparent to a person skilled in the art that some or all functionality provided may be embodied in software or software enabled devices.

The invention claimed is:

1. A method for a Base Station Controller of a mobile communication network for deciding on the placement of a transcoding functionality for a call involving a user equipment, said Base Station Controller and a Media Gateway controlled by a respective Mobile Switching Center Server, the mobile communication network communicating according to an IP Protocol, the method comprising the steps of:
   receiving from said Mobile Switching Center Server an indication of a codec type applicable to said call;
   receiving an indication whether the transcoding of said codec type could be placed in the selected Media Gateway or in a Transcoder and Rate Adapter Unit assigned to said Base Station Controller for said call;
   selecting to place the transcoding functionality either within the assigned Transcoder and Rate Adapter Unit or within the selected Media Gateway; and
   sending towards the Mobile Switching Center Server information on the selected codec and the placement of the transcoding functionality.

2. The method according to claim 1, wherein the Base Station Controller receives an indication on a preference where to place the transcoding of said codec type either in the selected Media Gateway or in said Transcoder and Rate Adapter Unit assigned to said Base Station Controller for said call.

3. The method according to claim 1, wherein a plurality of indications of a codec type applicable to said call and a corresponding plurality of indications of indication whether the transcoding of said codec types could be placed in the selected Media Gateway or in a Transcoder and Rate Adapter Unit assigned to said Base Station Controller for said call is received.

4. The method according to claim 1 wherein the selection to place the transcoding functionality is based on the availability of transcoding functionality within the assigned Transcoder and Rate Adapter Unit.

5. A method for a Mobile Switching Center Server of a mobile communication network for deciding on the placement of a transcoding functionality for a call involving a user equipment, a Base Station Controller and a Media Gateway controlled by said respective Mobile Switching Center Server, the mobile communication network communicating according to an IP Protocol, the method comprising the steps of:
   sending towards said Base Station Controller an indication of a codec type applicable to said call;
   sending towards said BSC an indication whether the transcoding of said codec type could be placed in the selected Media Gateway or in a Transcoder and Rate Adapter Unit assigned to said Base Station Controller for said call; and
   receiving from the Base Station Controller information on the selected codec and the placement of the transcoding functionality based on a selection within the Base Station Controller on the availability of transcoding functionality within the assigned Transcoder and Rate Adapter Unit to place the transcoding functionality either within the assigned Transcoder and Rate Adapter Unit or within the selected Media Gateway.

6. The method according to claim 5, wherein an indication on a preference where to place the transcoding of said codec type either in the selected Media Gateway or in a Transcoding Unit assigned to said Base Station Controller for said call is sent towards the Base Station Controller.

7. The method according to claim 5, wherein a plurality of indications of a codec type applicable to said call and a corresponding plurality of indications of indication whether the transcoding of said codec types could be placed in the selected Media Gateway or in a Transcoder and Rate Adapter Unit assigned to said Base Station Controller for said call is send.

8. A base station controller of a mobile communication network, the mobile communication network communicating according to an IP Protocol, the base station controller being arranged for deciding on the placement of a transcoding functionality for a call involving a user equipment, said Base Station Controller and a Media Gateway controlled by a respective Mobile Switching Center Server, the Base Station Controller comprising:
   a receiver for receiving from said Mobile Switching Center Server an indication of a codec type applicable to said call;
   said receiver being further arranged to receive an indication whether the transcoding of said codec type could be placed in the selected Media Gateway or in a Transcoder and Rate Adapter Unit of assigned to said Base Station Controller for said call;
   a processing unit for selecting to place the transcoding functionality either within the assigned Transcoder and Rate Adapter Unit or within the selected Media Gateway; and
   a transmitter for sending towards the Mobile Switching Center Server information on the selected codec and the placement of the transcoding functionality.

9. The base station controller according to claim 8, wherein the receiver is further to adapted to receive an indication on a preference where to place the transcoding of said codec type either in the selected Media Gateway or in said Transcoding Unit assigned to said Base Station Controller for said call.

10. The base station controller according to claim 8, wherein the receiver is further adapted to receive a plurality of indications of a codec type applicable to said call and a corresponding plurality of indications of indication whether the transcoding of said codec types could be placed in the selected Media Gateway or in a Transcoder and Rate Adapter Unit assigned to said Base Station Controller for said call.

11. The base station controller according to claim 8, wherein processor is further adapted to base the selection to place the transcoding functionality on the availability of transcoding functionality within the assigned Transcoder and Rate Adapter Unit.

12. A Mobile Switching Center Server of a mobile communication network, the mobile communication network communicating according to an IP Protocol, the Mobile Switching Center Server being arranged for deciding on the placement of a transcoding functionality for a call involving a user equipment, a Base Station Controller and a Media Gateway controlled by said respective Mobile Switching Center Server, comprising:
   a transmitter for sending towards said Base Station Controller an indication of a codec type applicable to said call;

said transmitter being further arranged to sending towards said Base Station Controller an indication whether the transcoding of said codec type could be placed in the selected Media Gateway or in a Transcoder and Rate Adapter Unit assigned to said Base Station Controller for said call; and a receiver for receiving from the Base Station Controller information on the selected codec and the placement of the transcoding functionality based on a selection within the Base Station Controller on the availability of transcoding functionality within the assigned Transcoder and Rate Adapter Unit to place the transcoding functionality either within the assigned Transcoder and Rate Adapter Unit or within the selected Media Gateway.

13. The Mobile Switching Center Server according to claim 12, wherein said transmitter is further arranged to send an indication on a preference where to place the transcoding of said codec type either in the selected Media Gateway or in a Transcoding Unit assigned to said Base Station Controller for said call towards the Base Station Controller.

14. The Mobile Switching Center Server according to claim 12, wherein said transmitter is further arranged to send a plurality of indications of a codec type applicable to said call and a corresponding plurality of indications of indication whether the transcoding of said codec types could be placed in the selected Media Gateway or in a Transcoder and Rate Adapter Unit of assigned to said Base Station Controller for said call.

* * * * *